United States Patent
Kao

(10) Patent No.: US 9,445,454 B2
(45) Date of Patent: Sep. 13, 2016

(54) SYSTEM AND METHOD FOR HARDWARE SHARING

(71) Applicant: Atmel Corporation, San Jose, CA (US)

(72) Inventor: Sean Kao, Irvine, CA (US)

(73) Assignee: Atmel Corporation, San Jose, CA (US)

( * ) Notice: Subject to any disclaimer, the term of this patent is extended or adjusted under 35 U.S.C. 154(b) by 432 days.

(21) Appl. No.: 13/904,002

(22) Filed: May 28, 2013

(65) Prior Publication Data

US 2013/0322417 A1    Dec. 5, 2013

Related U.S. Application Data

(60) Provisional application No. 61/652,611, filed on May 29, 2012.

(51) Int. Cl.
| | |
|---|---|
| *H04W 88/06* | (2009.01) |
| *H04L 27/00* | (2006.01) |
| *H04W 84/12* | (2009.01) |
| *H04W 80/02* | (2009.01) |
| *H04L 23/02* | (2006.01) |
| *H04L 27/26* | (2006.01) |

(52) U.S. Cl.
CPC .......... *H04W 88/06* (2013.01); *H04L 27/0008* (2013.01); *H04B 2201/70714* (2013.01); *H04L 23/02* (2013.01); *H04L 27/2601* (2013.01); *H04W 80/02* (2013.01); *H04W 84/12* (2013.01)

(58) Field of Classification Search
CPC .................................... H04W 88/06
See application file for complete search history.

(56) References Cited

U.S. PATENT DOCUMENTS

| | | | |
|---|---|---|---|
| 2003/0169769 A1* | 9/2003 | Ho | H04L 1/1621 370/473 |
| 2006/0023776 A1* | 2/2006 | Hsu | G01S 19/30 375/150 |
| 2007/0217534 A1* | 9/2007 | Lee et al. | 375/260 |
| 2009/0023454 A1* | 1/2009 | MacInnis | H04L 12/5695 455/452.2 |
| 2009/0323608 A1* | 12/2009 | Adachi | H04W 72/0453 370/329 |

* cited by examiner

*Primary Examiner* — Charles C Jiang
*Assistant Examiner* — Thad Defauw
(74) *Attorney, Agent, or Firm* — Fish & Richardson P.C.

(57) ABSTRACT

A method of transceiving data includes providing a wireless transceiver chip that supports multiple wireless standards for transceiving data packets, wherein a first wireless standard comprises a first modulation and demodulation scheme, and wherein a second wireless standard comprises a second modulation and demodulation scheme, and wherein the first modulation and demodulation scheme is incompatible with the second modulation and demodulation scheme; activating only one PHY layer of the wireless transceiver chip during the transceiving of the data packets; using a MAC layer of the wireless transceiver chip to specify whether the first or second wireless standard is to be used for a given transceiving of the data packets; and the PHY layer receiving instructions from the MAC layer regarding which wireless standard is to be used for the transceiving of the data packets using hardware that is shared by the PHY layer corresponding to both wireless standards.

20 Claims, 14 Drawing Sheets

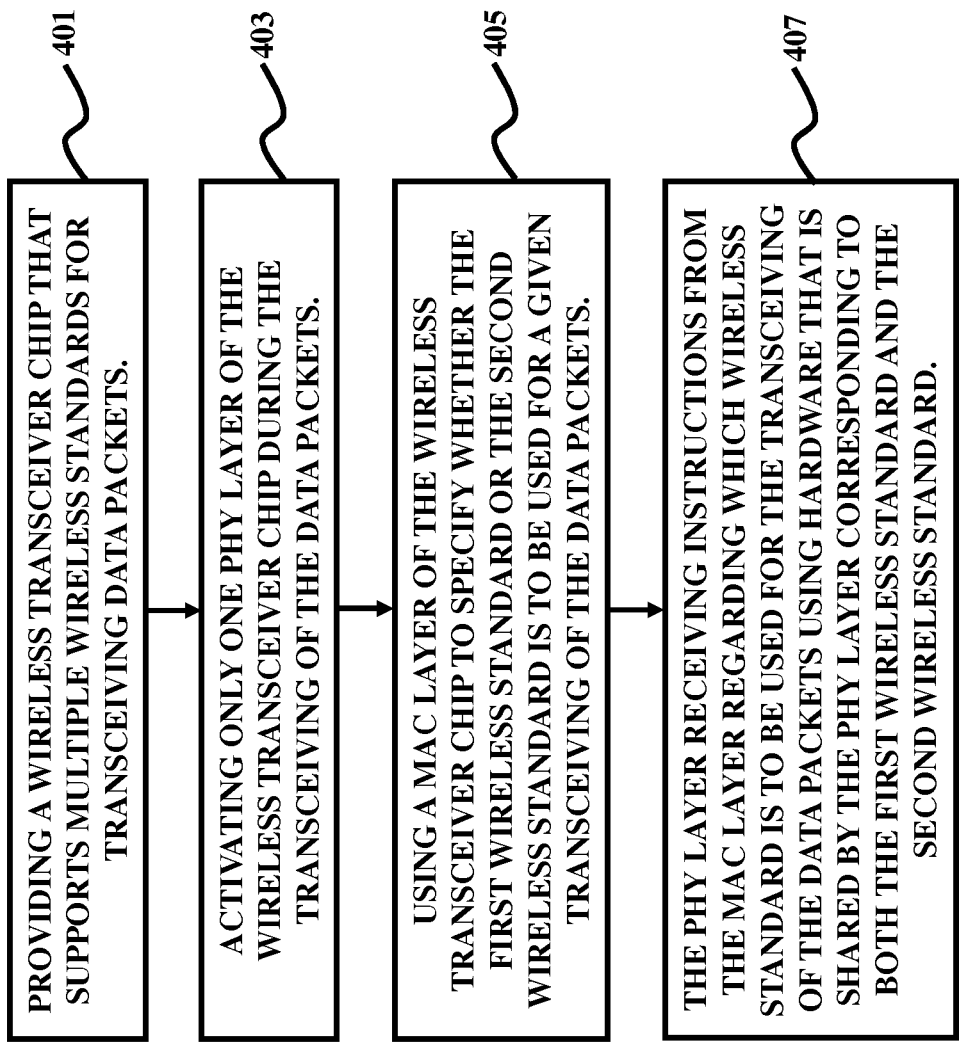

FIG. 8

| SNR | -3 | -2 | -1 | 0 | 1 | 2 | 5 |
|---|---|---|---|---|---|---|---|
| A corr Pd | | | 0.967 | 0.997 | | | 1 |
| A corr Pf | .066 | | .031 | .032 | | | 0.001 |
| B corr Pd | | | | | | | |
| B corr Pf | | | | | | | |

FIG. 9

| SNR | -3 | -2 | -1 | 0 | 1 | 2 | 5 |
|---|---|---|---|---|---|---|---|
| A corr Pd | | | 0.766 | 0.939 | | | 1 |
| A corr Pf | .007 | | .001 | .002 | | | 0 |
| B corr Pd | | | | | | | |
| B corr Pf | | | | | | | |

FIG. 10

| SNR | -3 | -2 | -1 | 0 | 1 | 2 | 5 |
|---|---|---|---|---|---|---|---|
| A corr Pd | | | 0.927 | 0.986 | 1 | 1 | 1 |
| A corr Pf | .016 | | .006 | .004 | .001 | .001 | 0 |
| B corr Pd | | | | | | | |
| B corr Pf | | | | | | | |

SYSTEM AND METHOD FOR HARDWARE SHARING

CROSS-REFERENCE TO RELATED APPLICATIONS

This application claims priority to U.S. Provisional Application Ser. No. 61/652,611 filed on May 29, 2012, the complete disclosure of which, in its entirety, is herein incorporated by reference.

BACKGROUND

1. Technical Field

The embodiments herein generally relate to wireless technologies, and, more particularly, to WiFi technologies.

2. Description of the Related Art

In IEEE standards 802.11a/b/g/n, more commonly known as WiFi, packets containing data, information, or connection requirements are transmitted and received by an access point (AP) and a station. The physical (PHY) layer is responsible for demodulating signals received over the air before passing data bits on to the Media Access Control (MAC) layer and for modulating data bits from the MAC to be transmitted over the air.

802.11n contains numerous enhancements to 802.11g to improve throughput. Moreover, there are many additional features to the MAC layer. 802.11n PHY layer uses the same architecture as 802.11g with some additional enhancements. Both 802.11g and 802.11n (as well as 802.11a) use Orthogonal Frequency Division Multiplexing (OFDM) as their modulation scheme. However, 802.11b PHY uses Direct-sequence spread spectrum (DSSS) and Complementary code keying (CCK) as its modulation technique. Accordingly, Wi-Fi PHY has two modes of operation: OFDM and single carrier.

However, the problem is the modulation/demodulation scheme for 802.11b and 802.11g are different and incompatible. Supporting both standards is necessary due to legacy reasons, however, including both PHYs is expensive in terms of area because the wireless transceiver chip is an application-specific integrated circuit (ASIC) which has limitations in die size. Moreover, both PHY cores need to work simultaneously in a WiFi receiver to detect the type of a packet. This causes a large die size. Therefore, it is desirable to develop a way to reduce the area overhead of supporting both 802.11b and 802.11g WiFi standards.

SUMMARY

In view of the foregoing, an embodiment herein provides a method of transceiving data, the method comprising providing a wireless transceiver chip that supports multiple wireless standards for transceiving data packets, wherein a first wireless standard of the multiple wireless standards comprises a first modulation and demodulation scheme, and wherein a second wireless standard of the multiple wireless standards comprises a second modulation and demodulation scheme, and wherein the first modulation and demodulation scheme is incompatible with the second modulation and demodulation scheme; activating only one physical (PHY) layer of the wireless transceiver chip during the transceiving of the data packets; using a Media Access Control (MAC) layer of the wireless transceiver chip to specify whether the first wireless standard or the second wireless standard is to be used for a given transceiving of the data packets; and the PHY layer receiving instructions from the MAC layer regarding which wireless standard is to be used for the transceiving of the data packets using hardware that is shared by the PHY layer corresponding to both the first wireless standard and the second wireless standard. During transmission of the data packets, the MAC layer specifies whether the first wireless standard or the second wireless standard is to be used for a given transmission of the data packets. The method may further comprise the PHY layer transmitting the data packets using either the first wireless standard or the second wireless standard based on the instructions from the MAC layer.

During reception of the data packets, the PHY layer detects which the wireless standard was used by a transmitter and demodulates a received wireless signal by configuring the shared hardware. The hardware that is shared may comprise any of channel equalizers, signal filters, phase rotators, frequency/timing offset estimators, IQ imbalance estimators, variable interpolators/decimators, scrambler/descrambler, Forward/Reverse Fast/Discrete Fourier/Cosine Transforms (FFT/IFFT/DFT/DCT), and correlators. The hardware that is shared may comprise any of multipliers, adders, Random Access Memories (RAMs), Read-Only Memories (ROMs), dividers, accumulators, shift-registers, register-files, look-up tables, and timing controllers. The first wireless standard comprises WiFi that uses Orthogonal Frequency Division Multiplexing (OFDM) as the first modulation and demodulation scheme, and the second wireless standard comprises WiFi that uses Direct-sequence spread spectrum (DSSS) and Complementary code keying (CCK) as the second modulation and demodulation scheme. The hardware that is shared may be used for a same purpose for each of the first modulation and demodulation scheme and the second modulation and demodulation scheme. Also, the hardware that is shared may be used for a different purpose for each of the first modulation and demodulation scheme and the second modulation and demodulation scheme.

Another embodiment provides a wireless transceiver chip comprising a first PHY layer corresponding to a first wireless standard comprising a first modulation and demodulation scheme; a second PHY layer corresponding to a second wireless standard comprising a second modulation and demodulation scheme; a MAC layer that specifies whether the first wireless standard or the second wireless standard is to be used for a given transceiving of the data packets; and hardware that is shared by both the first PHY layer and the second PHY layer, wherein the first modulation and demodulation scheme is incompatible with the second modulation and demodulation scheme, wherein only one of the first PHY layer or the second PHY layer is activated during transceiving of data packets, and wherein the activated PHY layer receives instructions from the MAC layer regarding which wireless standard is to be used for the transceiving of the data packets using the shared hardware.

During transmission of the data packets, the MAC layer specifies whether the first wireless standard or the second wireless standard is to be used for a given transmission of the data packets. The activated PHY layer transmits the data packets using either the first wireless standard or the second wireless standard based on the instructions from the MAC layer. During reception of the data packets, the activated PHY layer detects which the wireless standard was used by a transmitter and demodulates a received wireless signal by configuring the shared hardware. The shared hardware may comprise any of channel equalizers, signal filters, phase rotators, frequency/timing offset estimators, IQ imbalance estimators, variable interpolators/decimators, scrambler/descrambler, FFT/IFFT/DFT/DCT, and correlators. The shared hardware may comprise any of multipliers, adders, RAMs, ROMs, dividers, accumulators, shift-registers, register-files, look-up tables, and timing controllers. The first wireless standard comprises WiFi that uses OFDM as the first modulation and demodulation scheme. The second wireless standard comprises WiFi that uses DSSS and CCK as the second modulation and demodulation scheme. The shared hardware may be used for a same purpose for each of the first modulation and demodulation scheme and the second modulation and demodulation scheme. Also, the shared hardware may be used for a different purpose for each of the first modulation and demodulation scheme and the second modulation and demodulation scheme.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 4 is a flow diagram illustrating a method according to an embodiment herein;

FIGS. 8 through 10 illustrate tables indicating results achieved according to the embodiments herein;

DETAILED DESCRIPTION OF PREFERRED EMBODIMENTS

Figure 1:
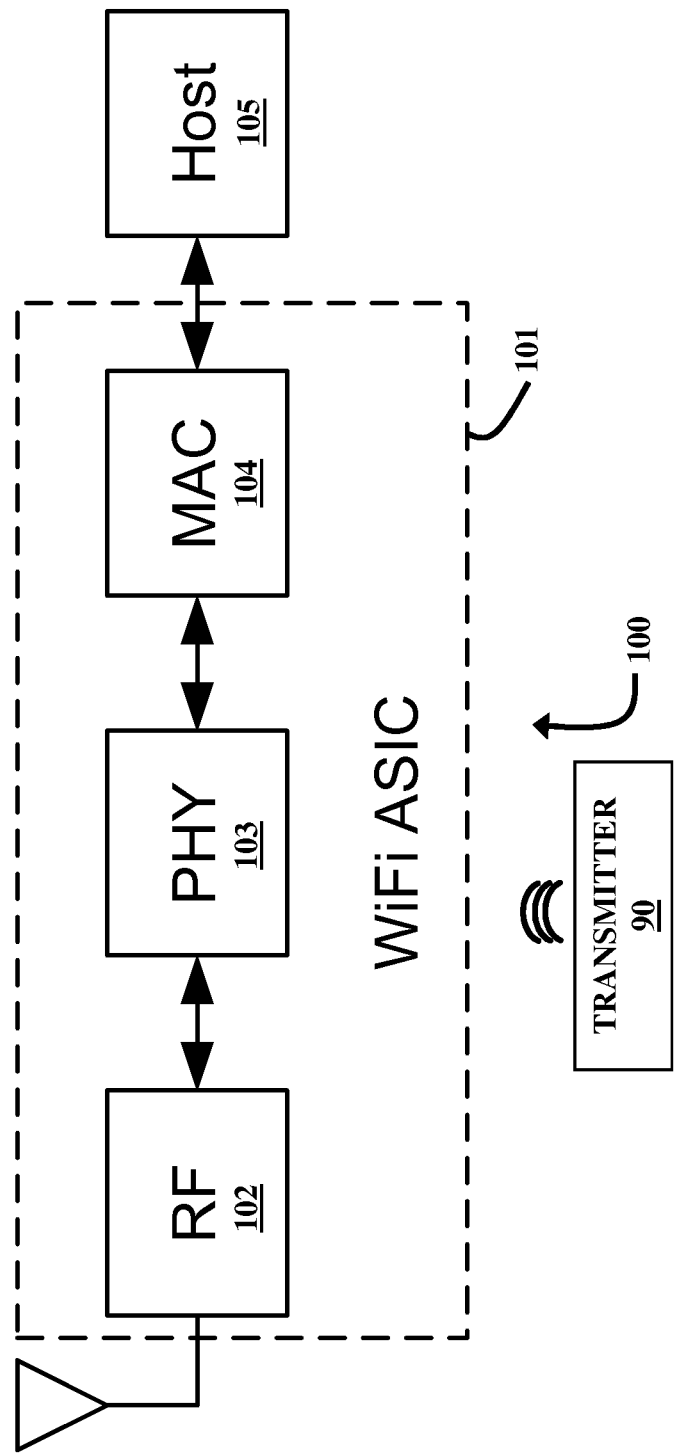
FIG. 1 illustrates a block diagram of a WiFi PHY/MAC architecture of a WiFi ASIC.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide a system and method for sharing hardware thereby reducing the area overhead for supporting both 802.11b and 802.11g WiFi standards. Referring now to the drawings, and more particularly to FIGS. 1 through 12, where similar reference characters denote corresponding features consistently throughout the figures, there are shown preferred embodiments.

FIG. 1 illustrates a block diagram of a WiFi PHY/MAC architecture 100 of a WiFi ASIC 101 used in accordance with the embodiments herein. Since only one PHY 103 needs to be active for a given packet, hardware can be used for both standards. During transmission, the MAC 104 specifies which standard is to be used (802.11b or 802.11a/g/n) and the PHY103 transmits using the appropriate standard using the shared hardware. During reception (e.g., through RF 102), the PHY 103 detects which standard was used by the transmitter 90 and demodulates the received signal by configuring the shared hardware appropriately. The host 105 refers to any device that uses the WiFi ASIC 101 to communicate to a wireless network (e.g., network 25 of FIG. 12). Therefore, for a mobile phone, the host 105 could be the phone's baseband processor. For a PC/laptop, the host 105 could be the main CPU. From a stack perspective, the host 105 may also refer to the user's operating system or the software stack. The WiFi ASIC 101 itself transmits and receives data from an Access Point (e.g. wireless router) (not shown).

Figure 2:
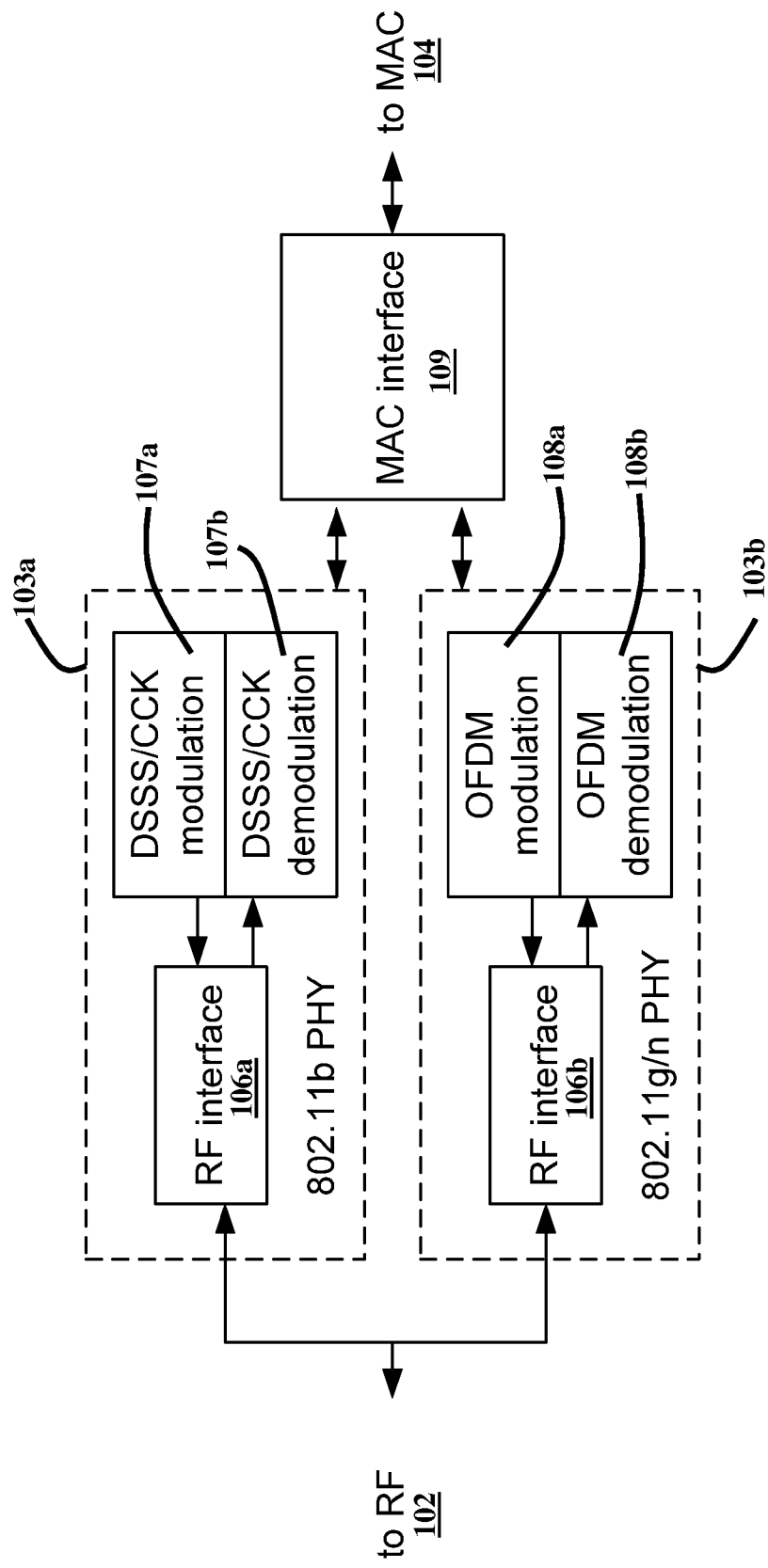
FIG. 2 illustrates a block diagram of a WiFi PHY architecture.

FIG. 2, with reference to FIG. 1, illustrates a block diagram of a WiFi PHY architecture used in accordance with the embodiments herein. The DSSS/CCK modulation 107a and demodulation 107b is shown communicating with the RF interface 106a for the 802.11b PHY 103a, and the OFDM modulation 108a and demodulation 108b is shown communicating with the RF interface 106b for the 802.11g/n PHY 103b. The MAC interface 109 to the MAC 104 is also shown.

Figure 3A:
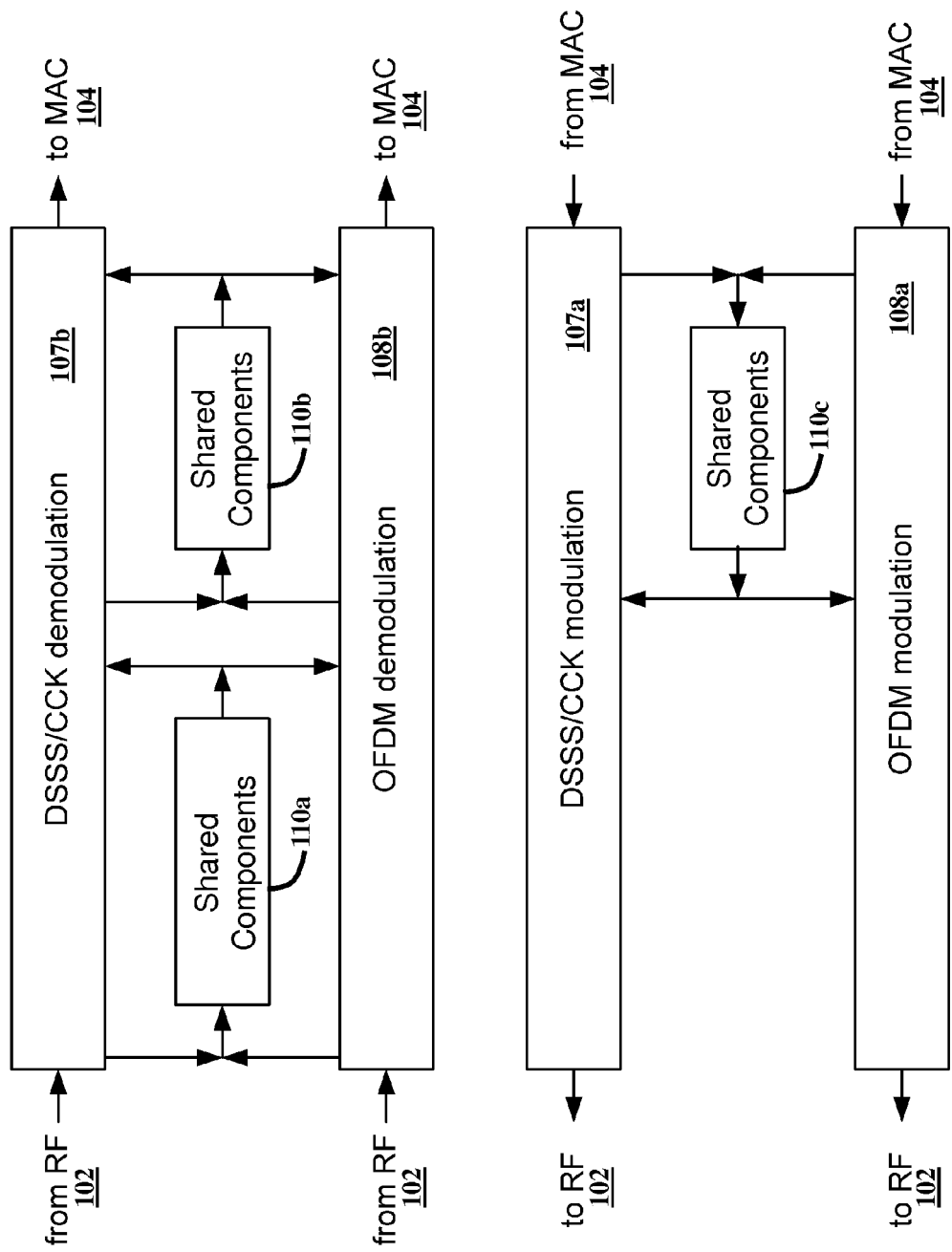
FIGS. 3A through 3C illustrate block diagrams of a hardware sharing technique according to an embodiment herein.

FIG. 3A, with reference to FIGS. 1 through 2, illustrates a block diagram illustrating hardware sharing according to an embodiment herein. This technique reduces the amount of hardware required for the WiFi PHY. According to the embodiments herein, the major transmitter/receiver components are shared between the DSSS/CCK and OFDM modes of operation. For example, the shared components 110a-c may include components such as: channel equalizers, signal filters, phase rotators, frequency/timing offset estimators, IQ imbalance estimators, variable interpolators/decimators, scrambler/descrambler, Forward/Reverse Fast/Discrete Fourier/Cosine Transforms (FFT/IFFT/DFT/DCT), and correlators, among other components. Furthermore, building block circuits (not shown) are shared including circuits such as: multipliers, adders, Random Access Memories (RAMs), Read-Only Memories (ROMs), dividers, accumulators, shift-registers, register-files, look-up tables, and timing controllers, among other components.

Figure 3B:
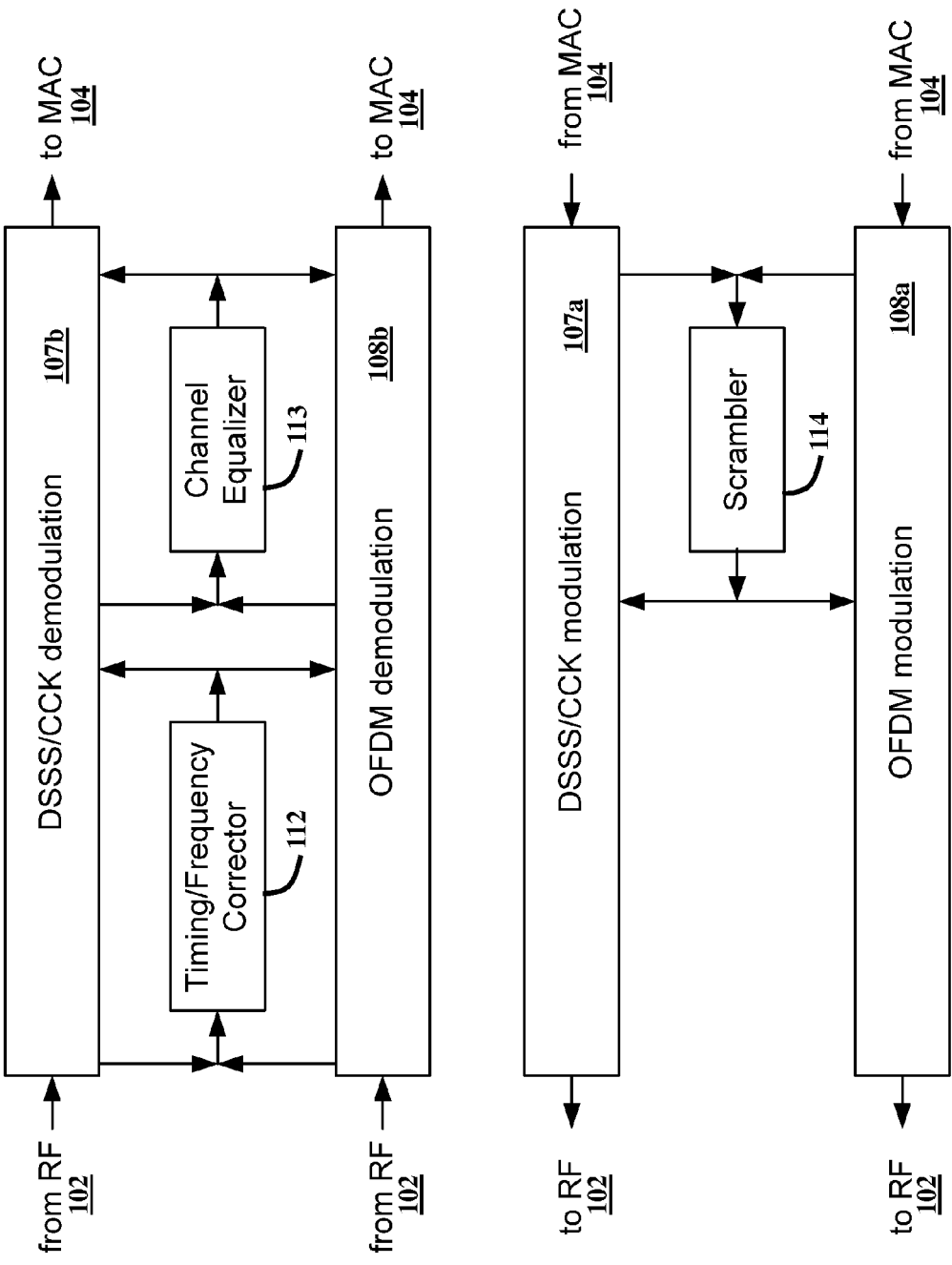
Figure 3C:
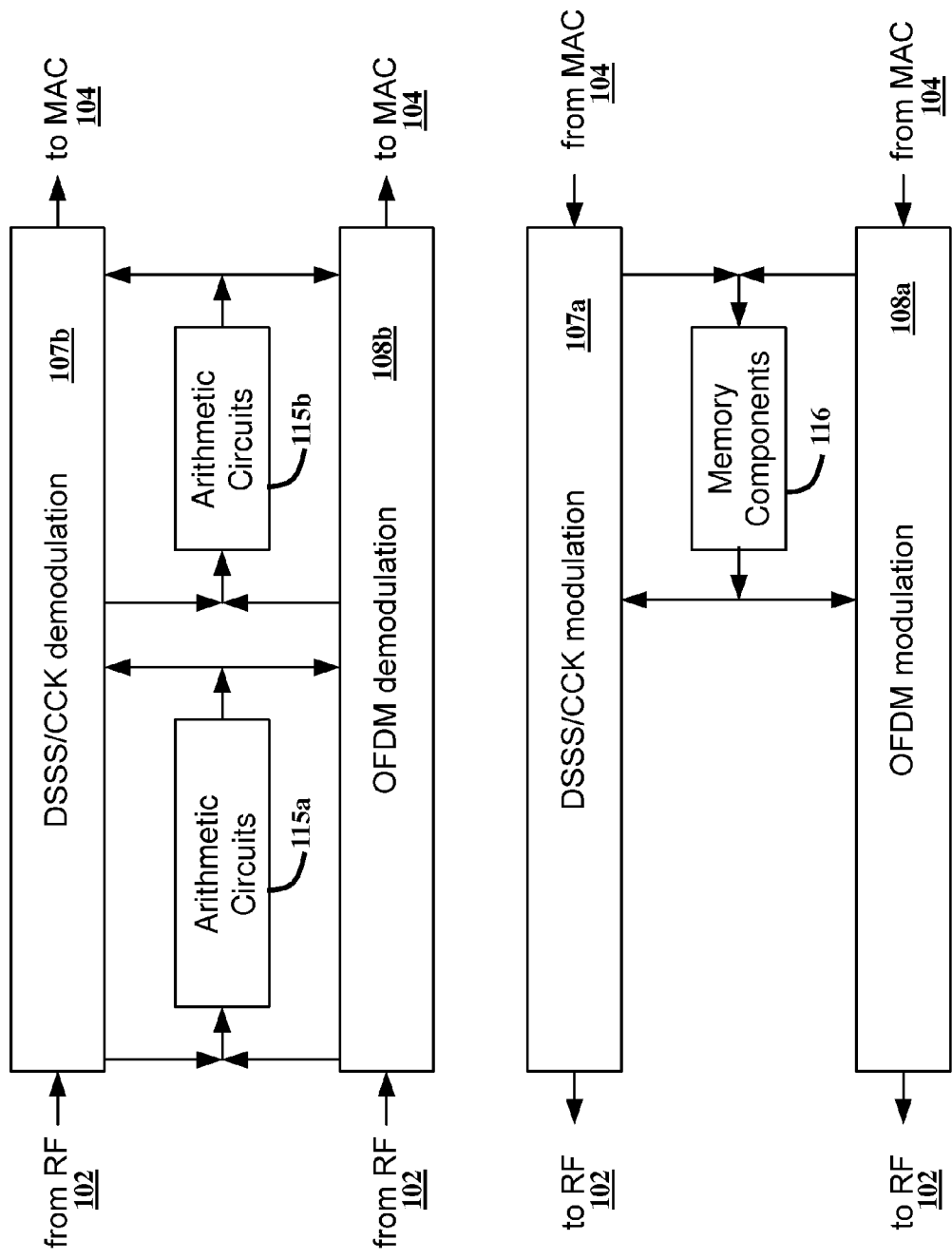

Therefore, sharing hardware is accomplished by using major components for both 802.11b transceiving and 802.11a/g/n transceiving (e.g., standards 103a, 103b). Moreover, according to one aspect of the embodiments herein, the major components are used for similar purposes for both standards. Even though DSSS/CCK demodulation 107b and OFDM demodulation 108b are significantly different, both systems must still perform similar tasks to correct for non-idealities such as timing and frequency offset or channel impairments. In this case, for example, blocks such as timing or frequency correctors 112 or channel equalizers 113 can be used for the same purpose as seen in FIG. 3B. Additionally, DSSS/CCK modulation 107a and OFDM modulation 108a are also significantly different, and both systems/standards 103a, 103b require scrambling of the data bits to ensure proper randomization. In this case, blocks such as scramblers 114 can be used for the same purpose.

According to another aspect of the embodiments herein, the major components are used for dissimilar purposes for both standards 103a, 103b. The major components may be useful for both standards even in two completely separate contexts. For example, OFDM requires a Fourier Transform for both receiving and transmission. However, a Fourier Transform may also be useful for DSSS/CCK demodulation to aid in channel equalization. Accordingly, the embodiments herein leverage the similar components for dissimilar purposes.

In another aspect of the embodiments herein, hardware sharing is performed by using building block circuits for both 802.11b transceiving and 802.11a/g/n transceiving (e.g., standards 103a, 103b). Here, arithmetic circuits 115a-b such as multipliers, adders, and dividers are useful in many different contexts for demodulation 107b, 108b in both standards 103a, 103b. Since demodulation of only one standard has to be executed at a given time, arithmetic circuits 115a-b can be used in different blocks. Moreover, memory components 116 such as RAMs, shift-registers, register-files, or register banks are generally useful for many different purposes for holding or delaying data and information.

FIG. 4, with reference to FIGS. 1 through 3C, is a flow diagram illustrating a method of transceiving data according to an embodiment herein, the method comprising providing (401) a wireless transceiver chip that supports multiple wireless standards for transceiving data packets, wherein a first wireless standard of the multiple wireless standards comprises a first modulation and demodulation scheme, and wherein a second wireless standard of the multiple wireless standards comprises a second modulation and demodulation scheme, and wherein the first modulation and demodulation scheme is incompatible with the second modulation and demodulation scheme; activating (403) only one PHY layer (e.g., 103a or 103b) of the wireless transceiver chip 101 during the transceiving of the data packets; using (405) a MAC layer 104 of the wireless transceiver chip 101 to specify whether the first wireless standard or the second wireless standard is to be used for a given transceiving of the data packets; and the PHY layer (e.g., either 103a or 103b) receiving (407) instructions from the MAC layer 104 regarding which wireless standard is to be used for the transceiving of the data packets using hardware that is shared by the PHY layer (e.g., either 103a or 103b) corresponding to both the first wireless standard and the second wireless standard. During transmission of the data packets, the MAC layer 104 specifies whether the first wireless standard or the second wireless standard is to be used for a given transmission of the data packets. The method may further comprise the PHY layer (e.g., either 103a or 103b) transmitting the data packets using either the first wireless standard or the second wireless standard based on the instructions from the MAC layer 104.

During reception of the data packets, the PHY layer (e.g., either 103a or 103b) detects which the wireless standard was used by a transmitter 90 and demodulates a received wireless signal by configuring the shared hardware (e.g., 110a-c, 115a-b, 116). The hardware that is shared (e.g., 110a-c, 115a-b, 116) may comprise any of channel equalizers, signal filters, phase rotators, frequency/timing offset estimators, IQ imbalance estimators, variable interpolators/decimators, scrambler/descrambler, Forward/Reverse Fast/Discrete Fourier/Cosine Transforms (FFT/IFFT/DFT/DCT), and correlators. The hardware that is shared (e.g., 110a-c, 115a-b, 116) may comprise any of multipliers, adders, Random Access Memories (RAMs), Read-Only Memories (ROMs), dividers, accumulators, shift-registers, register-files, look-up tables, and timing controllers. The first wireless standard comprises WiFi that uses OFDM as the first modulation and demodulation scheme, and the second wireless standard comprises WiFi that uses DSSS and CCK as the second modulation and demodulation scheme. The hardware that is shared (e.g., 110a-c, 115a-b, 116) may be used for a same purpose for each of the first modulation and demodulation scheme and the second modulation and demodulation scheme. Also, the hardware that is shared (e.g., 110a-c, 115a-b, 116) may be used for a different purpose for each of the first modulation and demodulation scheme and the second modulation and demodulation scheme.

The embodiments herein provide a technique for early packet detection from the preamble and reuses hardware blocks (RAM, logic, multipliers, etc.) between OFDM and single carrier modes. The embodiments herein achieve a savings of around 0.3~0.4 mm$^2$ in 65 nm CMOS technology.

Figure 5:
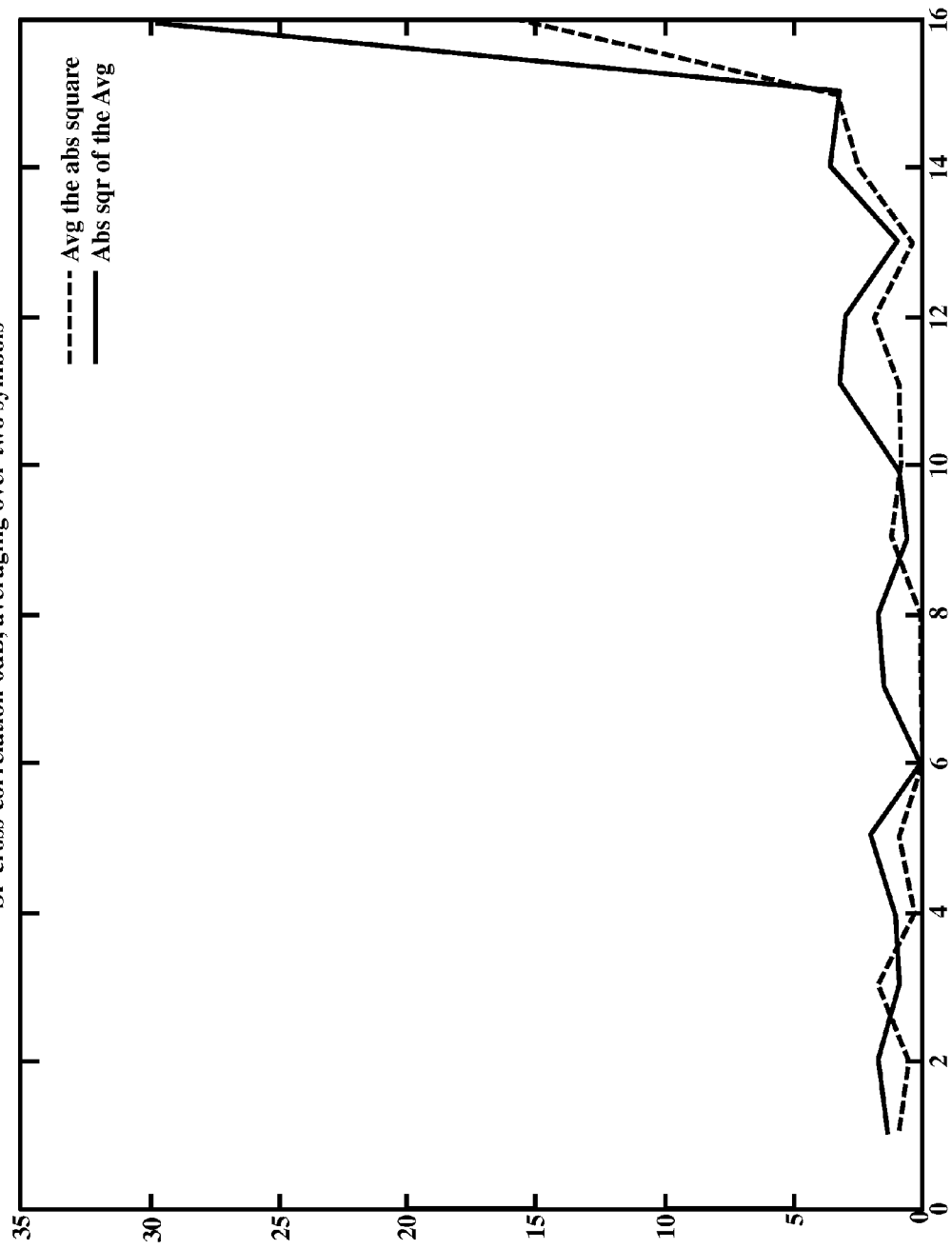
FIGS. 5 through 7 illustrate graphs indicating results achieved according to the embodiments herein.

In signal processing (SP) cross correlation, the Ittiam® algorithm averages the absolute value (abs) of the cross correlation of two successive SP parts. The embodiments herein modify this to get the average first, and then calculate the abs, which enhances the performance. The embodiments achieve this by adding one more buffers (for I,Q). The performance comparison, cross-correlation @ 0 dB, is shown in FIG. 5.

Figure 6:
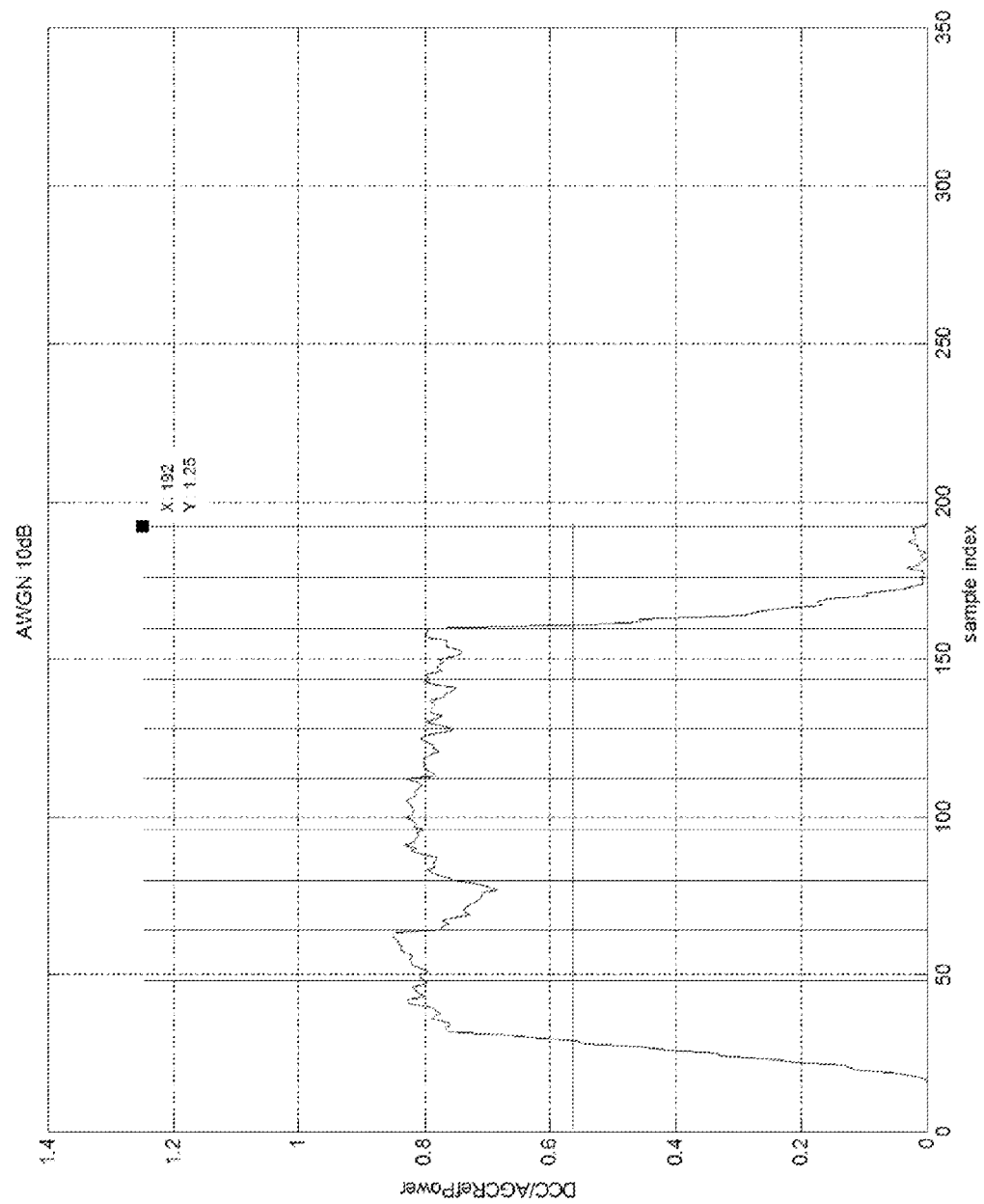
Figure 7:
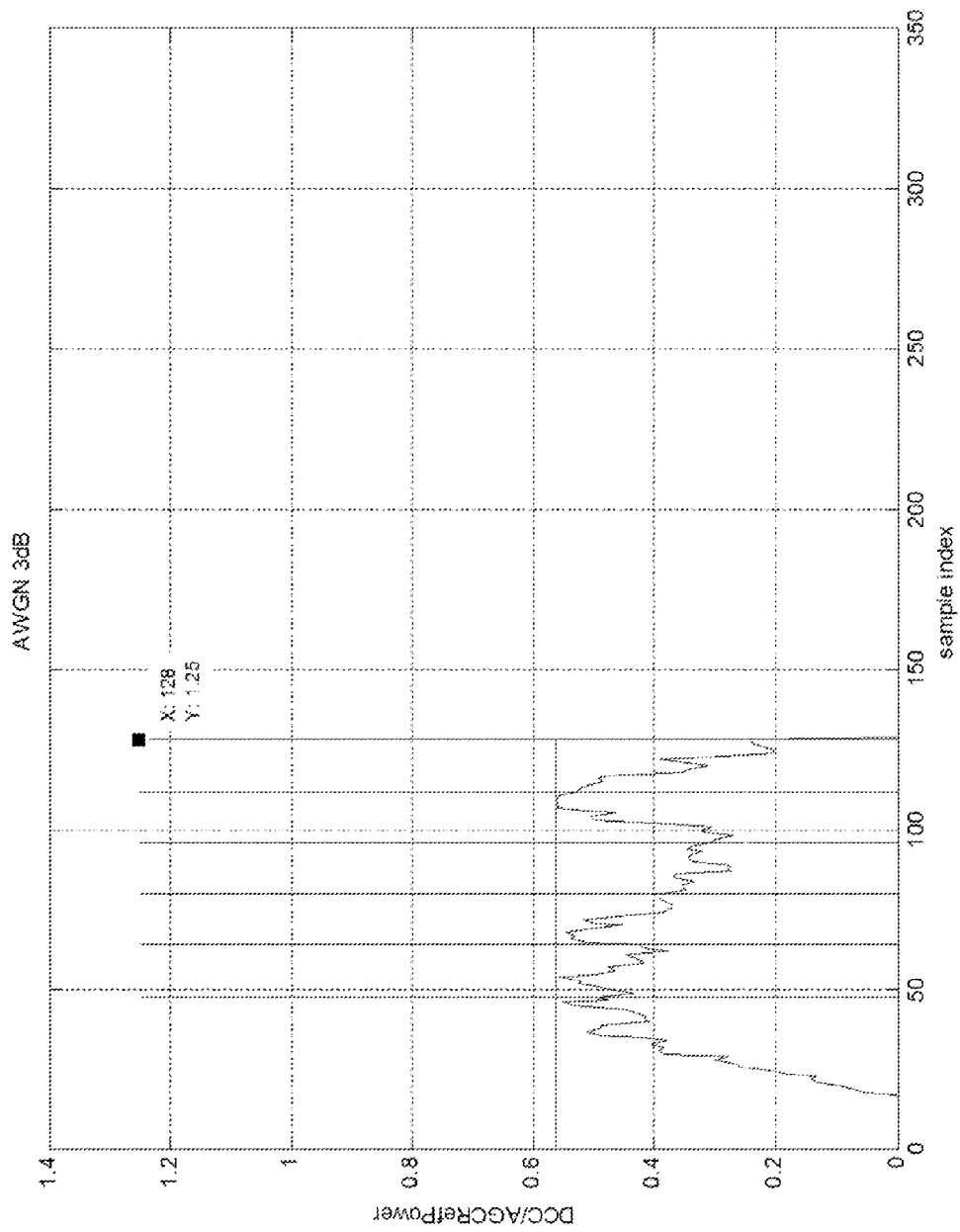

The acquisition implementation is finished and it provides good results for high SNR @ 10 dB as shown in FIG. 6. It gets the beginning of the linear programming (LP) (sample 192) exactly. As indicated in FIG. 7, at Low SNR (3 dB for example) the packet is detected but LP detection fails. The embodiments herein change the threshold value and characterize the performance at low SNR.

FIG. 8 summarizes the results at 1000 frames with a packet detection (16 moving sum window). FIG. 9 summaries the results at 1000 frames with a packet detection (32 moving sum window) th=0.25. FIG. 10 summarizes the results at 1000 frames with a packet detection (32 moving sum window) th=0.2.

Figure 11:
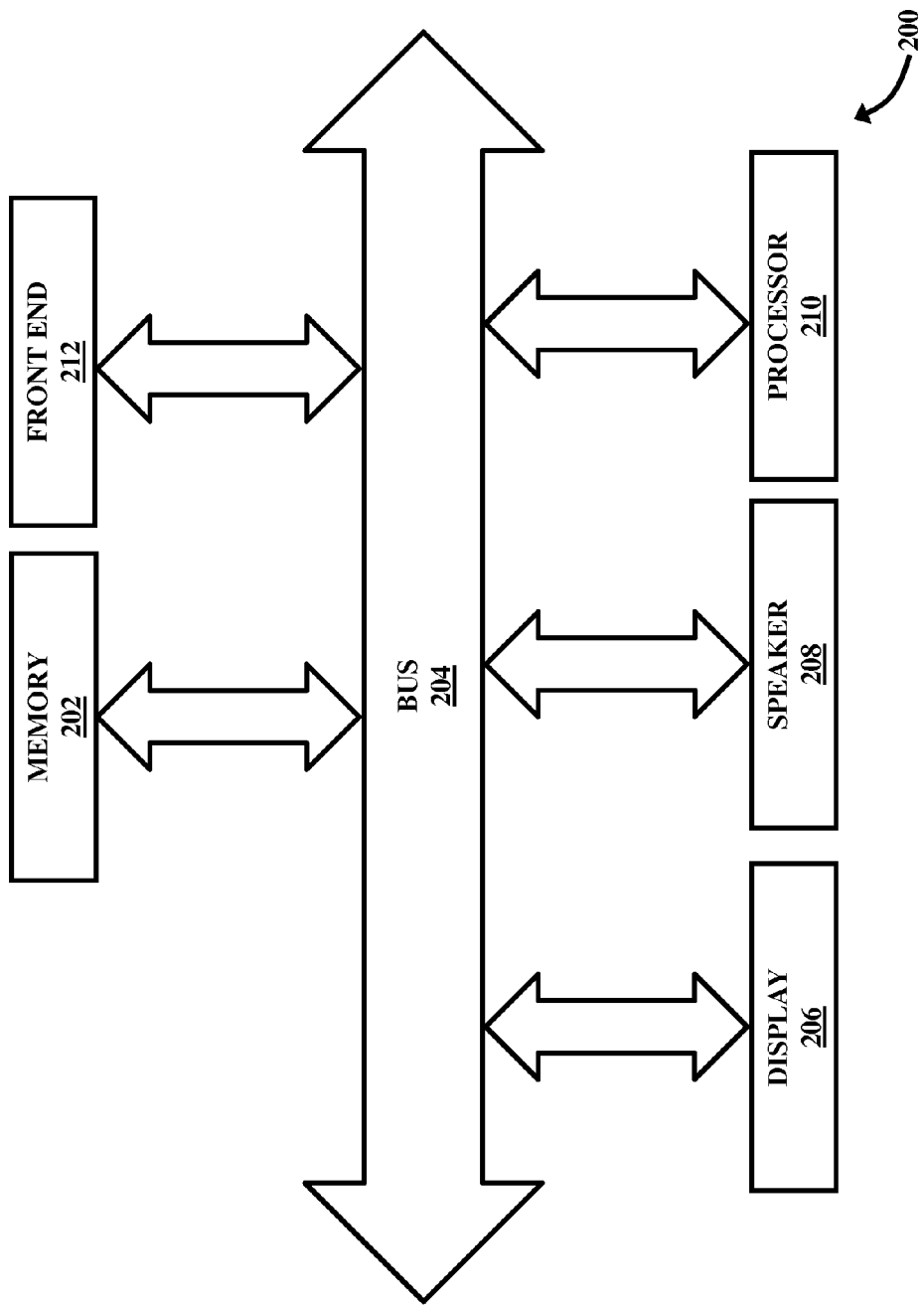
FIG. 11 is a block diagram of a receiver used in accordance with the embodiments herein.

FIG. 11 illustrates an exploded view of a receiver 200 having a memory 202 comprising a computer set of instructions. The receiver 200 further includes a bus 204, a display 206, a speaker 208, and a processor 210 capable of processing a set of instructions to perform any one or more of the methodologies herein, according to an embodiment herein. The processor 210 may also enable analog content to be consumed in the form of output via one or more displays 206 or audio for output via speaker and/or earphones 208. The processor 210 may also carry out the methods described herein and in accordance with the embodiments herein. The content may also be stored in the memory 202 for future processing or consumption. A user of the receiver 200 may view this stored information on display 206. When the content is selected, the processor 210 may pass information. The content may be passed among functions within the receiver 200 using bus 204. The receiver 200 may be operatively connected to a front end 212 for communication within a wireless communication network 25 (of FIG. 12).

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can include both hardware and software elements. The embodiments that are implemented in software include but are not limited to, firmware, resident software, microcode, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 12:
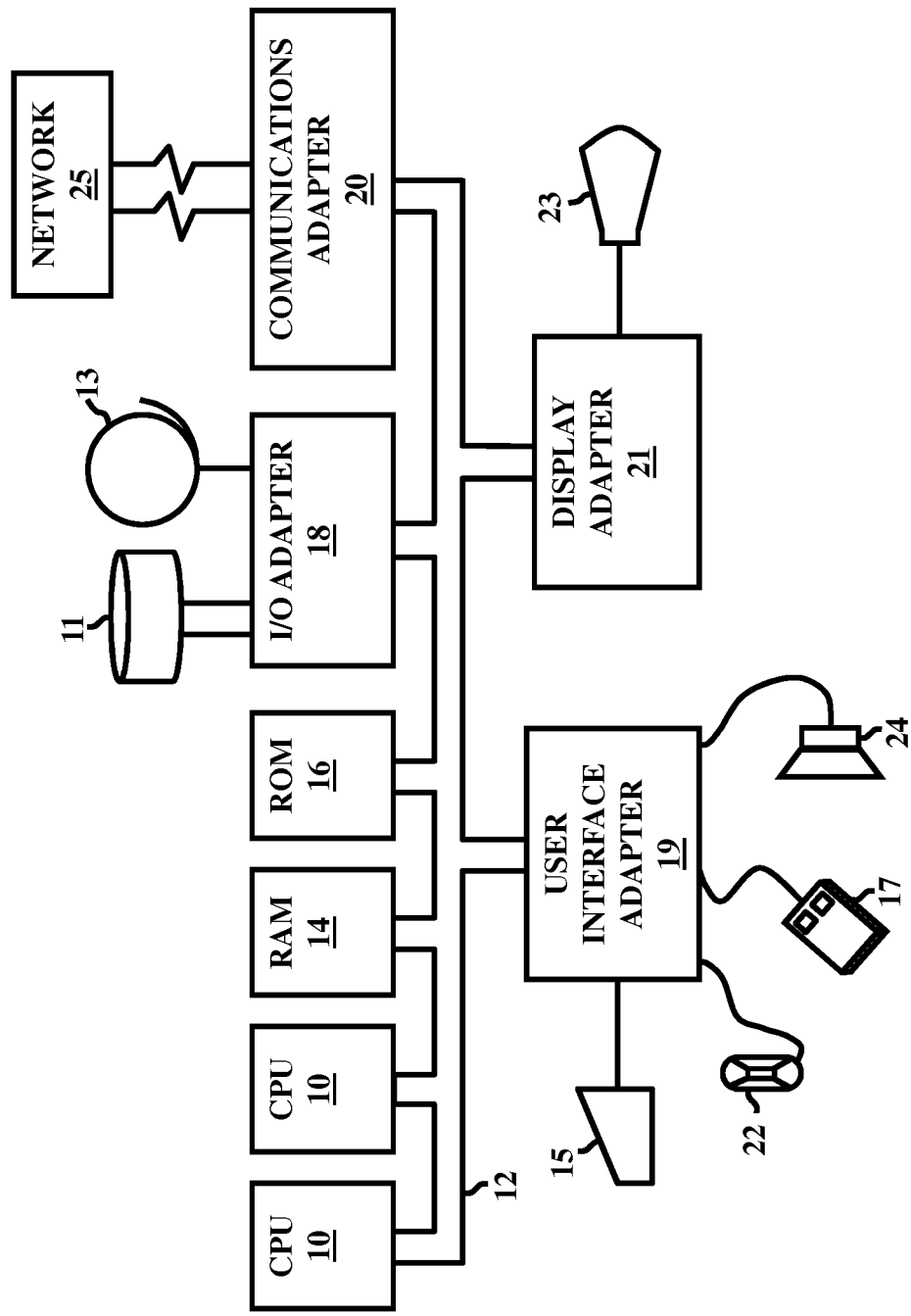
FIG. 12 is a block diagram of a computer system used in accordance with the embodiments herein.

A representative hardware environment for practicing the embodiments herein is depicted in FIG. 12. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method of transceiving data, said method comprising:
providing a wireless transceiver chip that supports multiple wireless standards for transceiving data packets, wherein the wireless transceiver chip comprises a first physical (PHY) layer corresponding to a first wireless standard of said multiple wireless standards that comprises a first modulation and demodulation scheme and a second physical (PHY) layer corresponding to a second wireless standard of said multiple wireless standards that comprises a second modulation and demodulation scheme, and wherein said first modulation and demodulation scheme is incompatible with said second modulation and demodulation scheme;
activating one physical (PHY) layer of said wireless transceiver chip during the transceiving of said data packets;
using a Media Access Control (MAC) layer of said wireless transceiver chip to specify whether said first wireless standard or said second wireless standard is to be used for a given transceiving of said data packets; and
said PHY layer receiving instructions from said MAC layer regarding which wireless standard is to be used for said transceiving of said data packets using hardware that is shared by the first PHY layer and the second PHY layer corresponding to both said first wireless standard and said second wireless standard,
wherein the shared hardware comprises at least one of:
a first shared component configured to be used by the first PHY layer for modulation according to the first wireless standard and by the second PHY layer for modulation according to the second wireless standard, or
a second shared component configured to be used by the first PHY layer for demodulation according to the first wireless standard and by the second PHY layer for demodulation according to the second wireless standard.

2. The method of claim 1, wherein during transmission of said data packets, said MAC layer specifies whether said first wireless standard or said second wireless standard is to be used for a given transmission of said data packets.

3. The method of claim 2, further comprising said PHY layer transmitting said data packets using either said first wireless standard or said second wireless standard based on said instructions from said MAC layer.

4. The method of claim 1, wherein during reception of said data packets, said PHY layer detects which said wireless standard was used by a transmitter and demodulates a received wireless signal by configuring the shared hardware.

5. The method of claim 1, wherein said hardware that is shared comprises any of channel equalizers, signal filters, phase rotators, frequency/timing offset estimators, IQ imbalance estimators, variable interpolators/decimators, scrambler/descrambler, Forward/Reverse Fast/Discrete Fourier/Co sine Transforms (FFT/IFFT/DFT/DCT), and correlators.

6. The method of claim 1, wherein said hardware that is shared comprises any of multipliers, adders, Random Access Memories (RAMs), Read-Only Memories (ROMs), dividers, accumulators, shift-registers, register-files, look-up tables, and timing controllers.

7. The method of claim 1, wherein said first wireless standard comprises WiFi that uses Orthogonal Frequency Division Multiplexing (OFDM) as said first modulation and demodulation scheme.

8. The method of claim 7, wherein said second wireless standard comprises WiFi that uses Direct-sequence spread spectrum (DSSS) and Complementary code keying (CCK) as said second modulation and demodulation scheme.

9. The method of claim 1, wherein said hardware that is shared is used for a same purpose for each of said first modulation and demodulation scheme and said second modulation and demodulation scheme.

10. The method of claim 1, wherein said hardware that is shared is used for a different purpose for each of said first modulation and demodulation scheme and said second modulation and demodulation scheme.

11. A wireless transceiver chip comprising:
a first physical (PHY) layer corresponding to a first wireless standard comprising a first modulation and demodulation scheme;
a second physical (PHY) layer corresponding to a second wireless standard comprising a second modulation and demodulation scheme;
a Media Access Control (MAC) layer that specifies whether said first wireless standard or said second wireless standard is to be used for a given transceiving of said data packets; and
hardware that is shared by both said first PHY layer and said second PHY layer, wherein said first modulation and demodulation scheme is incompatible with said second modulation and demodulation scheme,
wherein the shared hardware comprises at least one of:
a first shared component configured to be used by the first PHY layer for modulation according to the first wireless standard and by the second PHY layer for modulation according to the second wireless standard, or
a second shared component configured to be used by the first PHY layer for demodulation according to the first wireless standard and by the second PHY layer for demodulation according to the second wireless standard,
wherein one of said first PHY layer or said second PHY layer is activated during transceiving of data packets, and
wherein the activated PHY layer receives instructions from said MAC layer regarding which wireless standard is to be used for said transceiving of said data packets using the shared hardware.

12. The wireless transceiver chip of claim 11, wherein during transmission of said data packets, said MAC layer specifies whether said first wireless standard or said second wireless standard is to be used for a given transmission of said data packets.

13. The wireless transceiver chip of claim 12, wherein said activated PHY layer transmits said data packets using either said first wireless standard or said second wireless standard based on said instructions from said MAC layer.

14. The wireless transceiver chip of claim 11, wherein during reception of said data packets, said activated PHY layer detects which said wireless standard was used by a transmitter and demodulates a received wireless signal by configuring said shared hardware.

15. The wireless transceiver chip of claim 11, wherein said shared hardware comprises any of channel equalizers, signal filters, phase rotators, frequency/timing offset estimators, IQ imbalance estimators, variable interpolators/decimators, scrambler/descrambler, Forward/Reverse Fast/Discrete Fourier/Co sine Transforms (FFT/IFFT/DFT/DCT), and correlators.

16. The wireless transceiver chip of claim 11, wherein said shared hardware comprises any of multipliers, adders, Random Access Memories (RAMs), Read-Only Memories (ROMs), dividers, accumulators, shift-registers, register-files, look-up tables, and timing controllers.

17. The wireless transceiver chip of claim 11, wherein said first wireless standard comprises WiFi that uses Orthogonal Frequency Division Multiplexing (OFDM) as said first modulation and demodulation scheme.

18. The wireless transceiver chip of claim 17, wherein said second wireless standard comprises WiFi that uses Direct-sequence spread spectrum (DSSS) and Complementary code keying (CCK) as said second modulation and demodulation scheme.

19. The wireless transceiver chip of claim 11, wherein said shared hardware is used for a same purpose for each of said first modulation and demodulation scheme and said second modulation and demodulation scheme.

20. The wireless transceiver chip of claim 11, wherein said shared hardware is used for a different purpose for each of said first modulation and demodulation scheme and said second modulation and demodulation scheme.

* * * * *

UNITED STATES PATENT AND TRADEMARK OFFICE
CERTIFICATE OF CORRECTION

PATENT NO.        : 9,445,454 B2
APPLICATION NO.   : 13/904002
DATED             : September 13, 2016
INVENTOR(S)       : Sean Kao It is certified that error appears in the above-identified patent and that said Letters Patent is hereby corrected as shown below:

In the Claims

Column 9, Line 31; Delete "Co sine" and insert -- Cosine --, therefor.

Column 10, Line 40; Delete "Co sine" and insert -- Cosine --, therefor.

Signed and Sealed this
Twenty-second Day of November, 2016

Michelle K. Lee
*Director of the United States Patent and Trademark Office*